United States Patent
Ketchmark et al.

(10) Patent No.: US 9,351,500 B2
(45) Date of Patent: May 31, 2016

(54) AERATED MILK COMPOSITIONS

(75) Inventors: Jennifer L. Ketchmark, Minneapolis, MN (US); Sidney C. Kossowsky, Minneapolis, MN (US); Julie A. Cox, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 2189 days.

(21) Appl. No.: 11/345,550

(22) Filed: Feb. 1, 2006

(65) Prior Publication Data

US 2007/0178213 A1    Aug. 2, 2007

(51) Int. Cl.
- A23C 9/154    (2006.01)
- A23C 9/13     (2006.01)
- A23C 9/137    (2006.01)

(52) U.S. Cl.
CPC .............. *A23C 9/1307* (2013.01); *A23C 9/137* (2013.01); *A23C 2210/30* (2013.01); *A23V 2002/00* (2013.01)

(58) Field of Classification Search
CPC ........................................................ A23C 9/137
USPC .................................................. 426/583, 580
See application file for complete search history.

(56) References Cited

U.S. PATENT DOCUMENTS

| | | | | |
|---|---|---|---|---|
| 3,978,243 | A | * | 8/1976 | Pedersen ........................ 426/573 |
| 5,597,604 | A | * | 1/1997 | Chalupa et al. ............... 426/590 |
| 6,627,245 | B1 | | 9/2003 | Doat |
| 2001/0043979 | A1 | * | 11/2001 | Madsen et al. ................ 426/577 |
| 2003/0054086 | A1 | | 3/2003 | Murphy |
| 2003/0068406 | A1 | | 4/2003 | Nair |
| 2003/0194468 | A1 | | 10/2003 | Konkoly |
| 2003/0224089 | A1 | | 12/2003 | Engesser |
| 2003/0224101 | A1 | | 12/2003 | Engesser |
| 2005/0266138 | A1 | * | 12/2005 | Yuan et al. .................... 426/573 |

* cited by examiner

*Primary Examiner* — Hamid R Badr
(74) *Attorney, Agent, or Firm* — Rachel A. Kahler; Everett G. Diederiks, Jr.; Annette M. Frawley

(57) ABSTRACT

The present invention provides improvements in aerated milk compositions, such as yogurt based products, and methods for preparation thereof.

14 Claims, 1 Drawing Sheet

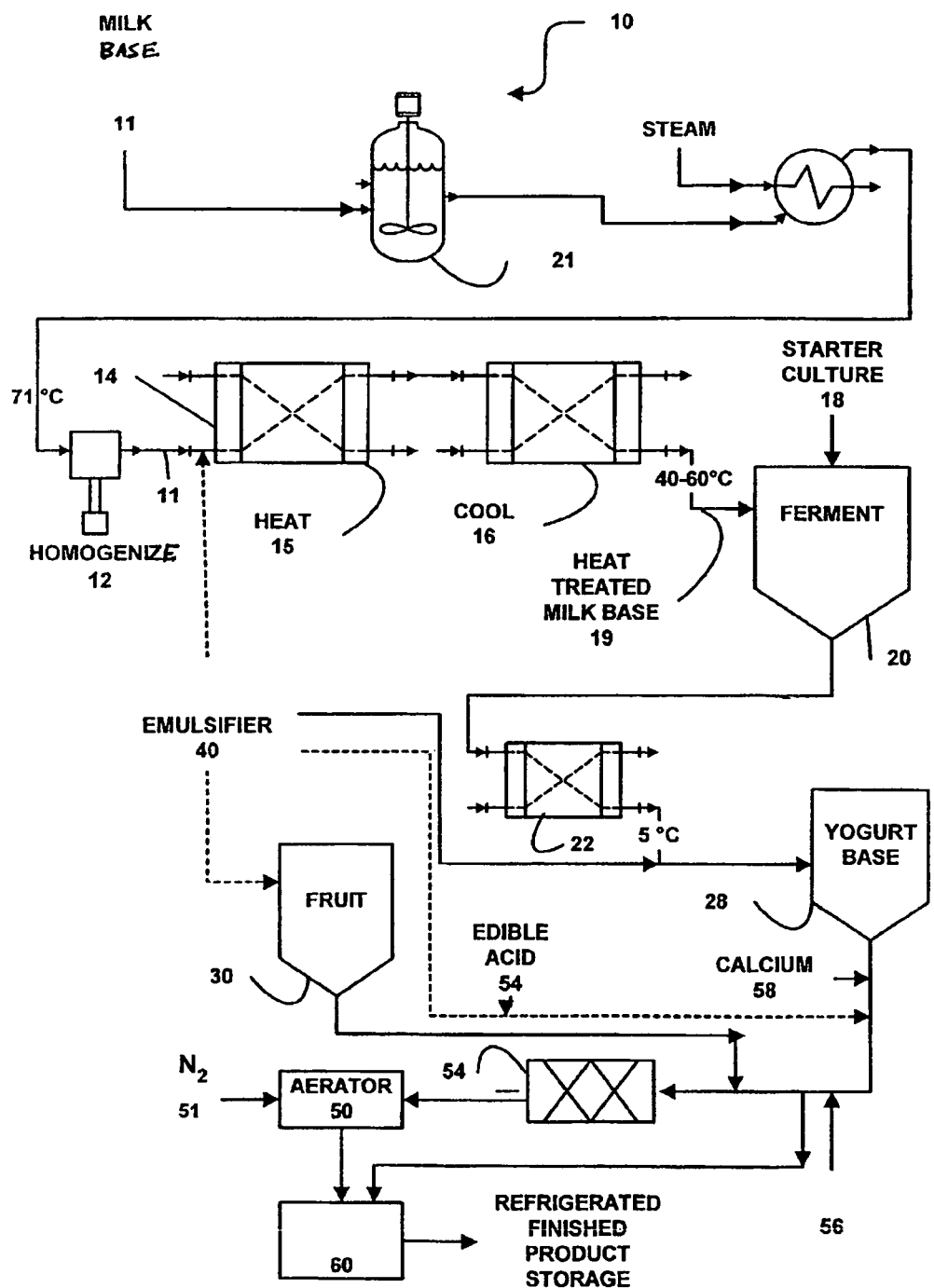

AERATED MILK COMPOSITIONS

FIELD OF THE INVENTION

The present invention relates to food products and to their methods of preparation. More particularly, the present invention relates to an aerated milk composition, especially yogurt based products and to their methods of preparation.

BACKGROUND OF THE INVENTION

The present invention provides improvements to aerated milk composition, especially yogurt based products, and more particularly, a stirred style and aerated yogurt based product that can be consumed as a flowable beverage.

Yogurt has long been believed to be a healthy food source and thus beneficial to the body in such a way that it is seen to "enhance" the microflora of the gut. Microorganisms in yogurt, including *Lactobacillus bulgaricus* and/or *Streptococcus thermophilus*, can help decrease or alleviate symptoms of lactose intolerance. In addition to bacterial cultures, one or more of other optional ingredients can also be added to the dairy ingredients, such as vitamins (for example, vitamin A and/or vitamin D), additional dairy products (for example, cream milk, partially skimmed milk, skim milk, or a combination of any of these), and other ingredients that can increase the nonfat solids content of the food (such as concentrated skim milk, nonfat dry milk, buttermilk, whey, lactose, lactalbumins, lactoglobulins, or whey modified by partial or complete removal of lactose and/or minerals), nutritive carbohydrate sweeteners (such as sugar, invert sugar, brown sugar, refiner's syrup, molasses, high fructose corn syrup, fructose, fructose syrup, maltose, maltose syrup, dried maltose syrup, malt extract, dried malt extract, malt syrup, dried malt syrup, honey, maple sugar, or others), flavoring ingredients, color additives, and/or stabilizers.

In addition to the wide range of ingredients used, yogurt is now available in a wide assortment of varieties of texture, fat content, sweetener type and level, and flavor among other attributes. From a yogurt manufacturing process standpoint all yogurts fall into one of two styles; namely, 1) set yogurts, and 2) stirred style. Within these broad two classifications, numerous yogurt varieties exist.

In the set style, the manufacturer fills cups or containers with an inoculated but unfermented milk base and quiescently holds the filled cups at warm temperatures to allow the yogurt to ferment therein. After the desired fermenting or maturing time, the product is cooled which arrests the culturing activity and also allows the body to set to form the gel-type texture. Set style yogurts have a relatively low initial viscosity (i.e., upon filling of its food package container) and a higher temperature ("temperature of filling") compared to the viscosity of stirred style yogurt products. As the product ferments and then is cooled, the viscosity of the product increases to final viscosity value that can be well above the initial viscosity.

In the second general category of yogurt products, the yogurt is of a stirred type. In producing stirred yogurt products, the manufacturer 1) ferments an inoculated milk base in bulk, e.g., in large stirred fermentation or culturing tanks, 2) cools the yogurt so formed to arrest the fermentation, and then 3) fills individual yogurt containers with thickened yogurt. Such production facilities are run in a continuous or semi-continuous manner. More specifically, after fermentation to desired acidity and thickness, the yogurt is pumped through cooling heat exchangers to arrest the fermentation. Alternatively, the yogurt can be cooled in a two stage process to reduce shear and maximize the viscosity of the product. In a two stage process the yogurt can be first cooled to 21° C. via a cooling plate, thereafter the yogurt can be cooled to 4° C. via a cooling tunnel. Flavorings and sweeteners can be admixed with the cooled yogurt and the yogurt is charged to containers. Care needs to be taken to minimize the shear imparted to the yogurt in practicing such process steps to minimize the loss of thickness or viscosity built up by the fermentation step. Thus, the stirred style yogurt typically has a higher viscosity than set style yogurts upon filling due to the lower temperature and the thickening affect of yogurt culture. Nonetheless, the stirred style yogurt typically builds or increases substantially in viscosity after filling over time until reaching its intended finish viscosity. Of course, stirred yogurts also come in various styles and product variations.

Most commonly, fruit constituents such as fruit preserves or purees are stirred into the stirred yogurt immediately prior to filling. Such stirred style yogurts comprising intermixed fruit purees are sometimes referred to most frequently as "Swiss" style or, less frequently but equivalently as "Continental" or "French" style. Occasionally, stirred Swiss style yogurts are formulated with high levels of stabilizers with the result that upon refrigerated storage for 48 hours, the yogurt possesses a solid-like consistency, somewhat reminiscent of custard style yogurt. Stirred style yogurts may also be used as a base for beverage products As can be appreciated from the above description of the numerous styles and flavors within styles of yogurts, product proliferation and differentiation is an important characteristic of commercial yogurt manufacture. In this highly competitive food product category, there is a continuing desire to develop novel products having distinctive visual, taste, and textural variations in order to stimulate interest in yogurt sales. Consumers also value convenience in consuming yogurt and may select yogurt based products that can be consumed as a beverage. In particular, it is believed that many consumers will find aesthetically attractive yogurt based products having a light or aerated texture that are consumed as a flowable product. Yogurt based products that are aerated or whipped can be characterized as having a density reduced from a native range of 1.1 to 1.2 g/cc (depending upon sugar content, fruit content, etc.) to a range of 0.30 g/cc to 1.0 g/cc.

Three primary difficulties are presented by the development of such aerated products characterized by having reduced density. First, unlike frozen dairy products such as ice cream or some aerated frozen yogurt or frozen yogurt containing products, yogurt is traditionally distributed and consumed with live bacterial cultures that require refrigerated distribution (2° C. to 10° C.). As a result of the storage temperature, the foam created by aeration is less stable in a refrigerated yogurt product leading to larger gas cells over time and even some collapse of the foam. Second, additives generally employed to increase initial foam volume in food products such as proteins, hydrocolloids, and other emulsifiers do not produce a sufficiently stable foam in a flowable system and can exhibit undesirable air cell coalescence leading to some collapse of the foam. Third, additives employed to increase initial foam volume and stability over time should not adversely affect other flavor and texture attributes. Notably, proteins added for aeration purposes can create an off-flavor in cultured dairy products.

One approach to overcoming these problems and obtaining a stable aerated milk composition is addition of an emulsifier or emulsifier blend to an unfermented milk base or to a yogurt base when producing a yogurt based product. Description of highly advantageous emulsifiers that are hydrated emulsifier blends and methods for preparing these hydrated emulsifier blends are contained, for example, in commonly assigned U.S. Publication No. 2003/0068406 (Nair et al.) in commonly assigned U.S. Publication No. and 2003/0224089 (Engesser et al.) the disclosures of which are incorporated herein by reference in its entirety. Aerated milk compositions prepared using these emulsifiers have been met with wide consumer acceptance and commercial success. However, these previously disclosed compositions are not flowable and may not be readily consumed without aid of silverware or other utensils.

The present invention is directed toward aerated milk compositions, especially yogurt based products, admixed with selected emulsifiers and stabilizers, that are aerated to provide filling and final viscosities and densities within specified ranges that allow for preparation of unique shake-type products that are flowable and may, for example, consumed without aid of silverware or other utensils.

These and other objects will become increasingly apparent by reference to the following description.

BRIEF SUMMARY OF THE INVENTION

The present invention is directed toward aerated milk compositions, especially yogurt based products, admixed with selected emulsifiers and stabilizers to provide filling and final viscosities and densities within specified ranges that allow for unique shake-type products and methods for preparation thereof. The aerated milk compositions are packaged as flowable product or a product that becomes flowable upon shaking, but in both cases the compositions essentially maintain their initial density. The methods for preparation comprise the steps of:

A. providing an unfermented milk base comprising:
  a. about 6% to about 13% milk solids;
  b. about 0% to about 5% fat;
  c. about 0% to about 15% sweetener;
  d. about 0.25% to about 1% gelatin;
  e. about 0.5% to about 2% starch;
  f. about 0 to about 0.1% gellan gum;
  g. about 0 to about 1.0% pectin;
  h. a starter culture;
  and having a native density of at least 1.1 g/cc at a temperature of about 4° C. to 3°° C.;
B. fermenting the milk base to form a yogurt base;
C. admixing about 2% to about 10% of an emulsifier, where the emulsifier may be a hydrated emulsifier blend comprising:
  a. about 0.5% to about 1.5% of a first emulsifier ingredient comprising a wetting agent;
  b. about 7% to about 15% of a second emulsifier ingredient such as lactylated mono- and di-glycerides;
  c. balance water, and a temperature of about 4° C. to 30° C.;
  to form a blended emulsified composition;
D. admixing a gas with the yogurt base;
E. aerating the gas and yogurt base composition to form an aerated milk composition having a density of about 0.50 g/cc to about 1.0 g/cc; and,
F. cooling the aerated milk composition to a temperature of about 0° C. to 5° C. The invention is directed more specifically to products wherein the gelatin is present at a level of about 0.25% to about 0.40% and products wherein the gelatin is present at a level of about 0.60 to about 1.0%. Where the aerated milk composition is a yogurt based product, yogurt base may have an initial pH of 4.2 to 5.3, 4.3 to 5.0, 4.3 to 4.7 and 5.0 to 5.3 depending, for example, on the cultures used and the final flavor of the yogurt based product.

BRIEF DESCRIPTION OF THE FIGURE

FIG. 1 is a schematic process flow diagram of a preferred embodiment of methods of the present invention.

DETAILED DESCRIPTION OF THE INVENTION

The present invention relates to improved aerated milk compositions such as yogurt based products and to methods of preparing such improved aerated milk compositions. "Yogurt" typically refers to compositions produced by culturing one or more dairy ingredients with a characterizing bacterial culture that contains a lactic acid-producing bacteria. As described herein, the term "yogurt" includes, but is not limited to, all of those food products meeting the definition as set forth in 21 C.F.R. §§ 131.200, 131.203, and 131.206. The aerated milk compositions of the invention as well as methods of preparation, product use and attributes thereof are described in detail below. Throughout the specification and claims, percentages are by weight and temperatures in degrees Celsius unless otherwise indicated. Similarly, values reported for viscosity will have been obtained at typical refrigerator temperatures (e.g. 5° C.).

Specifically, the invention relates to an aerated milk composition that is a stable, flowable, foamy, thick beverage. This type of product may be consumed as a shake directly from the container. The "flowable shake" product typically comprises about 0.25 to about 0.5% gelatin, about 0.05 to about 0.1% gellan gum and about 0.05 to about 1.0% pectin. In another embodiment, the "flowable shake" product typically comprises about 0.25 to about 0.5% gelatin, about 0 to about 0.1% gellan gum and about 0.05 to about 1.0% pectin. In another embodiment, the "flowable shake" product typically comprises about 0.25 to about 0.5% gelatin, about 0.05% to about 0.1% gellan gum and about 0 to about 1.0% pectin. Viscosity for this product may be about 6000 to about 7000 cps, increasing to about 11000 to about 13000 cps at the time of purchase by the consumer. Viscosities may be obtained at refrigerated temperatures on a Brookfield Viscometer using a spindle 5 at 10 rpm for 25 seconds. Gellan gum may be obtained from CP Kelco (Atlanta, Ga.) and the pectin is a high ester pectin and may be Pectin AMD 782 (DANISCO, Denmark) or HM Vis Pectin from CP Kelco.

The invention also relates to aerated milk compositions, such as yogurt based products, that will release from their gelled state when shaken for a short period of time and still retain a foamy flowable quality. When a consumer is ready to consume the drink, they shake the product held in a container for about 10 seconds to release the gel network, open the container, and drink the product with or without a straw. This "shaken" product may have a viscosity of about 17000 to about 20000 cps when shipped and may shake down to about 7000 to about 10,000 cps. These products typically would comprise about 0.6 to about 1.0% gelatin, about 0.05 to about 0.1% gellan gum and about 0.05 to about 1.0% pectin. In another embodiment, the "shaken" products typically would comprise about 0.6 to about 1.0% gelatin, about 0 to about 0.1% gellan gum and about 0.05 to about 1.0% pectin. In another embodiment, the "shaken" products typically would comprise about 0.6 to about 1.0% gelatin, about 0.05 to about 0.1% gellan gum and about 0 to about 1.0% pectin.

Yogurt Production

Referring now to the drawing, FIG. 1 depicts methods for preparing a yogurt based product, more specifically a stirred yogurt product that is aerated and flowable, generally designated by reference numeral 10. Method 10 comprises the steps of fermenting 20 a milk base, admixing 40 an emulsifier, aerating 50 to form an aerated yogurt and, in some embodiments, filling 60 containers with the aerated yogurt. Additional information concerning preparation of fermented stirred yogurt is contained, for example, in commonly assigned U.S. Pat. No. 5,820,903 entitled "Calcium fortified yogurt and methods of preparation" (issued Oct. 13, 1998 to Fleury et al.), the disclosure of which is incorporated herein in its entirety. As further described below, admixing step 40 may be performed at various points in method 10.

Briefly, the process of preparing a yogurt for use in aerated milk compositions of the invention typically begins with forming or providing an unfermented milk base comprising at least one fermentable dairy ingredient. The fermentable dairy ingredient can comprise raw milk but can contain a combination of whole milk, skim milk, condensed milk, dry milk solids (e.g. dry milk solids non-fat or, equivalently, "MSNF"), grade A whey, cream and/or such other milk fraction ingredients as buttermilk, whey, lactose, lactalbumins, lactoglobulins, or whey modified by partial or complete removal of lactose and/or minerals, other dairy ingredients to increase the nonfat solids content, which are blended to provide the desired fat and solids content. The unfermented milk base can include a filled milk component, i.e., a milk ingredient having a portion supplied by a non-milk ingredient, e.g., oil or soybean milk.

Also, while bovine milk is typically used in preparing an unfermented milk base, other milks can be used in substitution for bovine milk whether in whole or in part, e.g., camel, goat, sheep or equine milk. In other embodiments, an unfermented milk base can comprise a vegetable milk such as soy milk.

The unfermented milk base may further comprise sweeteners, such as nutritive carbohydrate sweetening agent(s). Exemplary useful nutritive carbohydrate sweetening agents include, but are not limited to, sucrose, high fructose corn syrup, dextrose, various DE corn syrups, beet or cane sugar, invert sugar (in paste or syrup form), brown sugar, refiner's syrup, molasses (other than blackstrap), fructose, fructose syrup, maltose, maltose syrup, dried maltose syrup, malt extract, dried malt extract, malt syrup, dried malt syrup, honey, maple sugar, except table syrup and mixtures thereof. The unfermented milk base and sweeteners (such as fructose, corn syrup, sucrose) can be blended in a mix tank 21.

The unfermented milk base may further comprise a food grade starch. One such is a modified corn starch such as THERMTEX modified corn starch from National Starch and Chemical (Bridgewater, N.J.).

The unfermented milk base mix may further comprise a bovine, porcine, or piscine gelatin. In view of religious dietary concerns a bovine gelatin is useful, often a bovine gelatin in the range of about 200 to about 250 bloom strength, such as a Type B bovine gelatin in the range of about 220 to about 230 bloom strength. Gelatin may be obtained from Gelita NORTH AMERICA (Sioux City, Iowa).

The unfermented milk base mix may further comprise gellan gum which may be obtained, for example, from CP Kelco (Atlanta, Ga.).

The unfermented milk base mix may further comprise pectin, especially a high ester pectin such as an AMD pectin (e.g. AMD Pectin 782 (DANISCO, Denmark)) or other high ester pectin such as HM Vis Pectin from CP Kelco (Atlanta, Ga.).

The unfermented milk base may also comprise sufficient amounts of an alkaline salt blend to prevent milk protein precipitation during pasteurization. The salt blend may be a blend of sodium citrate, sodium monophosphate, and polyphosphates known as JOHA KM2 purchased from BK Giulini, (Simi Valley, Calif.) for use with ultra-high temperature processed products. The JOHA KM2 product may be used in the unfermented milk base when AMD pectin is present.

Functional whey protein concentrates, such as WPC Bravo® from Grande Custom Ingredients Group (Lomira, Wis.) and WPC Proliant products from Proliant, Inc. (Ames, Iowa) may be added to the unfermented milk base at the 0% to about 1.5% level.

Additionally, potassium sorbate or other mold prevention ingredients can be added to the unfermented milk base at typical levels. For example, the unfermented milk base may comprise about 0.01 to about 0.05% of such mold inhibiting ingredients.

The ingredients in the unfermented milk base are admixed 21 to form a homogeneous or well blended mix. Next, the milk base 11 is optionally homogenized 12 in a conventional homogenizer to disperse evenly the added materials and the fat component supplied by various ingredients thereby forming a homogenized milk base. If desired, the milk base mix 11 can be warmed prior to homogenization from typical milk storage temperatures of about 5° C. to temperatures of about 65 to 75° C., such as 71° C. or 73° C. Homogenization may be performed in a two-stage homogenizer, with an exemplary target pressure of about 600 psi in the first stage, and an exemplary target pressure of 400 psi in the second stage.

The homogenized milk base may then be essentially heat treated (e.g. pasteurized) 14, typically by heating for times and temperatures effective to accomplish pasteurization to form a pasteurized or heat treated milk base 15. As is well known, the unfermented milk base 11 can be heated to lower temperatures for extended times, e.g., 88° C. for 30 minutes, or alternately to higher temperatures, e.g., 95° C., for shorter times, e.g., for about 38 seconds. Of course, intermediate temperatures for intermediate times can also be employed. Other pasteurization techniques or, less preferably, even sterilization, can be practiced (e.g., light pulse, ultra high temperature, ultra high pressure, etc.) if effective and economical. In certain commercial practices, the sequence of the homogenization and pasteurization steps can be reversed.

The homogenized and pasteurized milk base is then brought to incubation temperature, usually about 40° C. to 46° C. When heat pasteurization is employed, this step typically is followed by a cooling step 16. Thereafter, the homogenized and pasteurized milk base 19 is inoculated with a desired starter culture 18 such as a starter yogurt culture. Usually, a yogurt starter culture includes a combination of *Lactobacillus bulgaricus* (*Lactobacillus delbrucki subsp. bulgaricus*) and *Streptococcus thermophilus*. In other variations, the yogurt culture can additionally include a *Lactobacillus acidophilus, Lactbacillus bifidus, Lactobacillus subsp. casei, Lactobacillus delbrucki subsp. lactis*, and/or *Bifidobacterium bifidus* bacteria.

Fermentation step 20 may be quiescently continued until the inoculated milk base reaches an initial pH of approximately 4.2 to 5.3, and then optionally trated with a cooling step 22 to form a yogurt base 28. As used herein, the pH at which fermentation is halted is referred to as the "initial pH," while the pH at which the yogurt product settles after a period of storage at refrigerated temperatures (e.g., three weeks or more) is referred to as the "product pH." Depending upon temperature and amount of culture added, fermentation step 20 may take from about three to about 14 hours. In the preparation of a stirred style yogurt product, it is important that the mixture agitation be minimized during the fermentation process to allow proper curd formation. After fermentation to desired acidity and thickness, the yogurt base is pumped through cooling heat exchangers to arrest the fermentation.

Emulisfiers

The present methods further comprise admixing an emulsifier, such as the hydrated emulsifier blends disclosed in U.S. Publication No. 2003/0068406 (Nair et al.) and 2003/0224089 (Engesser et al.). For example, the hydrated emulsifier blend 40 may be blended at a temperature of about 4° C. to 30° C. with the yogurt base 28. The emulsifier 40 may alternatively be admixed with the unfermented milk base at a temperature of about 4° C. to 15° C. and for best results about 4° C. to 7° C.

The hydrated emulsifier blend may comprise: about 0.5% to 1.5% of the aqueous dispersion of a wetting agent; about 5% to 15% of the aqueous dispersion of a hydrated lactylated mono- and di-glycerides; and, the balance water. The hydrated emulsifier blend is at least pasteurized and cooled to a temperature of 4° C. to 30° C., to a temperature of 4° C. to 15° C., and for best results 4° C.

The hydrated emulsifier blend preparation methods comprise a first step of preparing an at least pasteurized hydrated emulsifier composition. This first step can involve a first sub-step of adding a first emulsifier or wetting agent to hot water to form a clear mixture. The wetting agent facilitates dispersion of the lactylated emulsifiers in the water to form the hydrated emulsifier composition. The wetting agent is selected from the group consisting of citric acid esters of monoglycerides, diacetyl tartaric acid esters of monoglycerides, polysorbates, propylene glycol esters, sodium dodecyl sulphate, sodium stearyl lactylate, sodium stearoyl lactylate and mixtures therein. Due to its effectiveness in low pH systems, diacetyl tartaric acid esters of monoglycerides are often used.

Diacetyl tartaric acid esters of monoglycerides ("DATEM") are more functional than other wetting agents in a low pH system, such as the low pH system found in yogurt. The use of DATEM appears to minimize the amount of wetting agent which precipitates from the hydrated emulsifier blend. Additionally, DATEMs functionality appears to be less affected by the age of the lactylated mono-and di-glycerides comprised within the emulsifier blend than other wetting agents.

As the blend of lactylated mono- and di-glycerides ages the pH drifts downward, becoming more acidic resulting in a lower pH system which can be undesirable for wetting agents. DATEM is less susceptible than other wetting agents to the pH drift of the lactylated mono- and di-glycerides, allowing the DATEM to more effectively wet the lactylated mono- and di-glycerides.

The amount of wetting agent added to the composition has a direct effect on the viscosity of the hydrated emulsifier blend. Since the hydrated emulsifier blend will be added at refrigerated temperatures (generally about 1° C. to 7° C.) to the refrigerated dairy blend mix for ease of handling and mixing without imparting shear to the dairy blend mix, the hydrated emulsifier blend is desirably characterized by a thin texture, i.e., a low viscosity. Good results are obtained with low viscosity hydrated emulsifier blends having viscosities ranging from about 5,000 to 40,000 cps, preferably ranging from about 10,000 to 25,000 cps when added to cultured dairy products at refrigeration temperatures.

The first step of preparing an at least pasteurized hydrated emulsifier composition can further comprise a second sub-step of adding a second emulsifier ingredient such as an emulsifier blend of lactylated mono- and di-glycerides to the thoroughly intermixed wetting agent and hot water. The lactylated blend of mono- and di-glycerides is selected from the group consisting of lactylated mono- and di-glycerides, citrate acid esters of mono- and di-glycerides, and distilled monoglyerides. The second emulsifier ingredient may also be a blend of propylene ester with mono- and di-glycerides. It should be noted that gentle agitation can be beneficially maintained throughout the preparation of the hydrated emulsifier. The hydrated emulsifier blend can comprise about 5% to about 15% of the second emulsifier ingredient. The completion of the hydration can be visually determined by observing the formation of a white viscous mass that gradually thickens as the hydrated emulsifier blend is cooled to a temperature of 4° C. to 30° C., to a temperature of 4° C. to 15° C., and for best results 4° C. to 7° C. The admixed hydrated emulsifier blend so prepared has a native pH in the range of 6.0 to 6.5.

Where the emulsifier is added directly to an already fermented yogurt base 28, pasteurization provides bacteriological stability for a blended dairy/hydrated emulsifier product that does not receive further bacteriological treatment such as heat processing. Also, pasteurization is desirable to allow for production of an emulsifier, including a hydrated emulsifier blend, at one production facility and transportation to a separate milk composition manufacturing facility with a reduction in the spoilage tendency of the emulsifier during transport and storage. The pasteurized emulsifier can be packaged and transported from the production facility to a separate milk composition manufacturing facility in about one metric ton quantities via appropriate aseptic stainless steel containers, commonly referred to as totes. Alternatively, the pasteurized emulsifier can be packaged and transported in a variety of plastic containers easily identified by one skilled in the art.

In other contemplated uses of the emulsifier in the aerated milk composition of the invention, such as the pre-fermentation addition to a heat treated milk base, pasteurization of the emulsifier is also desirable. Pasteurization of the emulsifier prevents the degradation of a heat treated milk base when admixed. In addition, pasteurization of the emulsifier prior to admixture with the heat treated milk base allows for post-pasteurization addition of the emulsifier to the dairy blend mix. Such post-pasteurization addition in turn desirably allows the unfermented milk base to be prepared via or with high temperature, short time ("HTST") pasteurization, and the emulsifier to be prepared via batch pasteurization if desired.

Batch pasteurization the hydrated emulsifier blend is preferred, as emulsifiers, including the hydrated emulsifier blends described herein do not develop a high viscosity as a result of this technique. The viscosity of the hydrated emulsifier blend is dependent in important part on the amount of shear the hydrate undergoes. Batch pasteurized hydrate does not develop a high viscosity, whereas HTST as a result of a high flow of product and pumping can develop a fair amount of shear and a high viscosity. It is more critical to agitate the hydrated emulsifier blend pasteurized via HTST, in order to control and lower the viscosity, however agitation during cooling is always helpful in controlling the critical viscosity. Continuous pasteurization of the hydrated emulsion blend requires the hydrated emulsion be continually agitated during cooling to prevent large increases in viscosity.

The emulsifier can optionally be admixed with an edible organic acid 54 prior to addition to the yogurt base 28. The pH of the emulsifier, including the hydrated emulsifier blends, may be lowered with the addition of an edible organic acid from a native pH in the range of 6.0 to 6.5, to a range of about 3.7 to 4.7 prior to admixture with a yogurt base in order to minimize acid shock to the dairy base mix having a pH in the range of about 4.3 to 4.7. In the edible organic acid admixed with hydrated emulsifier embodiment, the hydrated emulsion blend is essentially characterized by a pH in the range of about 3.7 to 4.7, more specifically about 4.2 to 4.7, and for best results about 4.5. Such low pH hydrated emulsions have a shelf-life of up to 3 months at refrigerated temperatures, thus allowing extended storage of the hydrated emulsifier blend prior to admixture with the dairy blend mix. The pH can be conveniently lowered by adding an edible acid to the hydrated emulsion such as edible organic acids selected from the group consisting of citric acid, lactic acid, malic acid, succinic acid, tartaric acid, and mixtures thereof. The acid addition can be achieved by several methods, examples of which are incorporated by reference above. Citric acid for is advantageous due to taste and cost considerations. In other variations, buffers systems (e.g., a mixture of citric acid and sodium citrate) can be used.

The emulsifier, including the hydrated emulsifier blends described herein, can also be optionally admixed with a fruit constituent 30 prior to admixture with the dairy blend mix. This method additionally alleviates acid shock to a yogurt base 28. In the fruit constituent/hydrated emulsifier variation, the pH of the hydrated emulsifier blend can be lowered to about 4.0 to 4.7 by co-blending a cooled pasteurized hydrated emulsifier blend with an aseptic fruit constituent in a weight ratio of hydrated emulsifier blend to fruit prep base from about 1:1 to about 1.25:1, to form an emulsion bearing fruit prep base. The emulsion bearing fruit prep base can then be added to a dairy base mix.

Addition of an unacidified emulsifier with a pH in the range of 6.0 to 6.5 can result in a higher pH yogurt product having safety concerns. If the pH of the finished yogurt product is too high, the product exhibits greatly reduced bacteriological stability. Furthermore, since pH affects the gelling properties of milk proteins and flavor, maintenance of the pH within the proper range allows for addition to a yogurt base without further processing or formulation manipulation. Emulsifier can be admixed gently at 5 to 15 rpm with either of the unfermented milk base or the yogurt base. Typically, the emulsifier is added in an amount sufficient to stabilize air cells formed during aeration processes. Typical amounts can be in the range of about 2% to about 10%, or about 2% to about 4%, or about 3% based upon the weight of a yogurt base product at this stage.

The dairy base mix optionally further preferably comprises a calcium sequestrant 58 in amounts sufficient to prevent premature precipitation of the protein content in the dairy base mix. By premature protein precipitation is meant any protein coagulation during the heating or pasteurization or cooling steps, It is desirable that thickening of the dairy product occurs after the heat treatment such as during the fermentation step.

Aeration

The yogurt base 28 in combination with the emulsifier can then be admixed with a gas 51, such as nitrogen. The gas can be charged into the yogurt base using conventional methods. For example, the gas can be forced through small orifices into the dairy blend mix as the mix flows through a tube or vessel into a mixing chamber, where uniform distribution occurs. Any conventional nontoxic, odorless, tasteless gas, such as air, nitrogen, nitrous oxide, carbon dioxide and mixtures thereof can be used. The step of aerating or whipping 60 the dairy blend mix is carried out with temperature maintenance from a native density of about 1.1 g/cc to a density of about 0.57 g/cc to about 0.99 g/cc, or about 0.80 g/cc to about 0.90 g/cc to form an aerated milk composition. The skilled artisan will have little difficulty selecting a commercially available aerator/mixer for use herein. A Tanis Rotoplus 250 aerator available from Tanis Food Tec in The Netherlands may be used for aeration. The Tanis Rotoplus aerator consists of a mixing chamber fed by a positive displacement pump and air flow system. Product flow is controlled by pump speed adjustment and air flow is controlled by flowmeter adjustment. Stainless steel concentric rows of intermeshing teeth on a stator and a rotor produce a uniformity and consistency in the mix. A coolant, for example glycol, can be used in a jacket surrounding the mix chamber to maintain a constant temperature in the range of 4° C. to 30° C., or 4° C. to 15° C., and for best results 4° C. to 7° C. during aeration. mixer can shear the dairy blend mix and propellant, thus allowing the hydrated emulsifier blend to adhere and maintain separation of the dairy blend mix and propellant creating the desirable aircells.

A pressure of about 15 psi to about 35 psi can be maintained in the mixer to aid in the formation of aircells. The aerated milk composition can be gradually transported from about 17 psi to atmospheric pressure, the gradual shift in pressure reduces aircell collapse. Overrun (initial density minus the aerated density divided by the initial density) for the aerated milk composition may be about 10% to about 50%.

During aeration, it is very important to control temperature so desirable aircells form more readily during the aeration step. Maintaining the temperature between 4° C. to 30° C., more specifically 4° C. to 15° C., and for best results 4° C. 7° to C is important to controlling the final density of the product. Desirable aircells form at 24 to 48 hours with whipping and filling temperatures of between 4° C. to 30° C., between 4° C. to 15° C., and for best results 4° C. to 7° C.

Optional Ingredients

In certain embodiments, particularly low fat and/or lower calorie variations, the aerated milk composition comprises a high potency sweetener. Exemplary high potency sweeteners include aspartame, neotame, potassium acelsufame, saccharin, cyclamates, thaumatin and mixtures thereof. In one embodiment, the high potency non-nutritive carbohydrate sweetener 56 may be added to a yogurt base 28. Illustrative flavors include vanilla, amaretto, cheesecake, white chocolate, Café Au Lait, caramel apple, banana cream, lemon, lime, various fruit and berry flavors and mixtures thereof.

In yogurt based products having a higher pH, a sweet brown base component (such as a chocolate base) may be added to the yogurt base and admixed therewith to provide a flavored yogurt base having the sweet brown base component well blended therein. In some embodiments, the sweet brown base component is provided in the form of a syrup, such as a chocolate, dark chocolate, chocolate liquor, semi sweet chocolate, cocoa, dutched cocoa or milk chocolate syrup. In one such embodiment, the milk chocolate syrup is composed of dextrose, water, milk chocolate, and cocoa. Another suitable chocolate syrup is a chocolate syrup composed of dextrose, water, sweet chocolate, and cocoa.

The sweet brown base component can be characterized as a low water activity sweet brown base component. In some embodiments, the low water activity sweet brown base component water activity can be achieved via addition and/or adjustment of the weight percentage of optional ingredients such as fructose, sucrose, glucose, propylene glycol, glycerol, polyhydric alcohols (for example, mannitol, lactitol, isomalt, xylitol, sorbitol, maltitol), sodium chloride and combinations thereof, based upon the total weight of the low water activity sweet brown base component. In some embodiments, the sweet brown base component can exhibit a water activity (potassium chloride calibration) of 0.85 or less.

The sweet brown base component may have a total solids (70° C. vacuum oven, 16 hours) in the range of 65% to 75%, a Brix level in the range of about 63.0 to 73.0 degrees, and pH in the range of about 5.2 to 7.0.

The sweet brown base component may have a total fat content in the range of 0% to about 25%. Exemplary fat components include, but are not limited to, cocoa butter, vegetable oil, vegetable shortening, butter, dairy cream and mixtures thereof.

The sweet brown base component may also have a total sweetening agent content in the range of about 0% to about 75%. Exemplary sweetening agents include, but are not limited to, sucrose, high fructose corn syrup, dextrose, various DE corn syrups, beet or cane sugar, invert sugar (in paste or syrup form), brown sugar, refiner's syrup, molasses, fructose, fructose syrup, maltose, maltose syrup, dried maltose syrup, malt extract, dried malt extract, malt syrup, dried malt syrup, honey, maple sugar, and mixtures thereof.

The sweet brown base component can optionally include ingredients such as condensed milk, sweetened condensed milk, caramel, flavors (for example vanillin) and combinations thereof.

The sweet brown base component may be processed by heat to destroy any pathogenic microorganisms (such heat treatments may include, but are not limited to, pasteurization or commercial sterilization).

When the sweet brown base comprises a chocolate base, such chocolate bases can be obtained from any of a variety of commercial sources (for example, Sweet Ovations, Philadelphia, Pa., The J.M. Smuckers Company, Orrville, Ohio, and Atys US, Inc., Brecksville, Ohio). Typically, the sweet brown base components are provided in the form of syrups. The sweet brown base component is added in an amount sufficient to provide desirable organoleptic attributes to the yogurt composition, such as sweet brown, rounded flavors. Typically, the sweet brown base component is added in an amount in the range of about 2% to about 10%, or about 3% to about 8%, or about 4% to about 6%, based upon the total weight of the yogurt after admixture with the sweet brown base component. The sweet brown base component may be provided to the yogurt base at refrigerated temperatures.

If desired, the aerated milk composition can additionally include a fruit constituent such as a conventional fruit sauce or puree. If present, the fruit constituent can comprise about 2% to about 10% of the yogurt product, or about 5% to about 6% of the yogurt product. The present method thus can comprise the optional additional step of adding a fruit sauce or puree 50. The fruit sauce or puree can optionally comprise fortification such as vitamins, minerals, inulin, etc.

The fruit flavoring sauce or puree used may be any of a variety of conventional fruit flavorings commonly used in yogurt and yogurt based products. Typical flavorings include strawberry, raspberry, blueberry, strawberry-banana, boysenberry, cherry-vanilla, peach, pineapple, lemon, orange and apple. Generally, fruit flavorings include fruit preserves and fruit or fruit puree, with any of a combination of sweeteners, starch, stabilizer, natural and/or artificial flavors, colorings, preservatives, water and citric acid or other suitable acid to control the pH. Minor amounts (e.g., providing less than 50 mg of calcium per 226 g serving) of calcium can be added to the fruit to control the desired texture of the fruit preparation typically provided by a soluble calcium material such as calcium chloride. If aspartame is added to the aerated milk composition, all or a portion of the aspartame can be pre-blended with the fruit flavoring.

The aerated milk composition can additionally include a variety of other ingredients to increase their nutritional, organoleptic or other consumer appeal, e.g., fruit pieces, nuts, and partially puffed cereals.

Packaging

The finished aerated milk composition (whether blended with a fruit prep or as a separate phase) may be packaged in a conventional manner for handling and storage purposes. The aerated milk composition, with or without fruit (whether blended with the yogurt base or as a separate phase) may then be finally placed in a conventional container typically used for yogurt and related products such as a coated paper or plastic cup, a bottle, or a tube fabricated from a flexible film. After filling, the filled containers are applied with a lid or other closure or seal, such as a metal seal or a metal seal with a plastic layer interposed between the metal seal and the aerated milk composition. $CO_2$ may optionally be added to the headspace in the filled container as described in commonly assigned entitled "Packaged Food Articles With Enriched Headspace and Method of Preparation" U.S. Pat. No. 6,793,950 to Archibald et al. the disclosure of which is incorporated by reference herein in its entirety.

The aerated milk compositions disclosed herein may further be understood in reference to the following examples.

EXAMPLE 1

Aerated milk compositions were prepared having the following formulation Milk Base Formula:

| Ingredients | Amount (Weight %) |
| --- | --- |
| Water | 74 |
| Non-fat dried milk | 10.5 |
| Cream | 3.5 |
| Sweetener | 10.5 |
| Starch | 1.0 |
| Gelatin | 0.4 |
| Gellan Gum | 0.05 |
| HM Vis Pectin | 0.1 |
| K sorbate | 0.026 |
| Vitamins | 0.004 |
| Anti-foam | 0.005% |

An unfermented milk base comprising water, non-fat dried milk, cream, sugar, HFCS, starch, gelatin, gellan gum, and HM Vis Pectin (CP Kelco), potassium sorbate, vitamins and antifoam was homogenized and pasteurized. The heat treated milk base was cooled and starter culture added. The heat treated milk base was then fermented to a pH of 5.0 and thereafter cooled to refrigeration temperatures to form a yogurt base. Thereafter, a hydrated emulsifier blend consisting of water, sodium stearoyl lactylate, and a lactylated blend of mono- and diglycerides available from Danisco Cultor in Copenhagen, Denmark under the trade designation Lactem P22 at a temperature of 5° C. was folded into the yogurt base at a 3% level. A fruit puree was also added to a 5% level at this time.

The emulsified yogurt base was then aerated with nitrogen gas in a Tanis Rotoplus 250 aerator to a target overrun of 17% with actual overrun of 18.4%. Density measurement for an aerated milk composition prepared according to this embodiment showed density prior to aeration of 1.09 g/cc and density after aeration of 0.89 g/cc. Upon shaking of the aerated milk composition prepared according to this embodiment by hand for ten seconds, the density was 0.90 g/cc. Viscosity of the aerated milk compositions 24 hours after aeration was 10700 cps. After shaking, measurements of viscosity gave a reading of 7200 cps.

EXAMPLE 2

An aerated milk composition was prepared having the following formulation.

Milk Base Formula:

| Ingredients | Amount (Weight %) |
|---|---|
| Water | 70 |
| Non-fat dried milk | 10 |
| Cream | 5 |
| Sweeteners | 13 |
| Starch | 0.75 |
| Gelatin | 0.4 |
| Gellan Gum | 0.05 |
| Pectin AMD 782 | 0.40 |
| Joha Buffering Salts | 0.05 |
| Vitamins | 0.004 |
| Anti-foam | 0.005% |
| K sorbate | 0.026 |

Preparation of an emulsified yogurt base was conducted as in Example 1. The emulsified yogurt base was then aerated with nitrogen gas in a Tanis Rotoplus 250 aerator to an overrun of 15.90%. Density measurement for an aerated milk composition prepared according to this embodiment showed density prior to aeration of 1.08 g/cc and density after aeration of 0.90 g/cc. Upon shaking of the aerated milk composition prepared according to this embodiment by hand for ten seconds, the density was 0.92 g/cc. Viscosity of the aerated milk compositions 24 hours after aeration was 12400 cps. After shaking, measurements of viscosity gave a reading of 9200 cps.

EXAMPLE 3

An aerated milk composition was prepared having the following formulation.

| Ingredients | Amount (Weight %) |
|---|---|
| Water | 70 |
| Non-fat dried milk | 10 |
| Cream | 5 |
| Sweetener | 13 |
| Starch | 0.75 |
| Gelatin | 0.4 |
| Gellan Gum | 0.05 |
| HM Vis Pectin | 0.1 |
| K sorbate | 0.026 |
| Vitamins | 0.004 |
| Anti-foam | 0.005% |

Preparation of an emulsified yogurt base was conducted as in Example 1. The emulsified yogurt base was then aerated with nitrogen gas in a Tanis Rotoplus 250 aerator to an overrun of 18.80%. Density measurement for an aerated milk composition prepared according to this embodiment showed density prior to aeration of 1.09 g/cc and density after aeration of 0.89 g/cc. Upon shaking of the aerated milk composition prepared according to this embodiment by hand for ten seconds, the density was 0.91 g/cc. Viscosity of the aerated milk compositions 24 hours after aeration was 10000 cps. After shaking, measurements of viscosity gave a reading of 6800 cps.

EXAMPLE 4

An aerated milk composition was prepared having the following formulation.

| Ingredients | Amount (Weight %) |
|---|---|
| Water | 77 |
| Non-fat dried milk | 6 |
| Cream | 3.5 |
| Sweetener | 10.5 |
| Starch | 2.0 |
| Gelatin | 0.6 |
| Gellan Gum | 0.1 |
| HM Vis Pectin | 0.3 |
| K sorbate | 0.026 |
| Vitamins | 0.004 |
| Anti-foam | 0.005% |

Preparation of an emulsified yogurt base was conducted as in Example 1. The emulsified yogurt base was then aerated with nitrogen gas in a Tanis Rotoplus 250 aerator to an overrun of 18.90%. Density measurement for an aerated milk composition prepared according to this embodiment showed density prior to aeration of 1.07 g/cc and density after aeration of 0.87 g/cc. Upon shaking of the aerated milk composition prepared according to this embodiment by hand for ten seconds, the density was 0.90 g/cc. Viscosity of the aerated milk composition 24 hours after aeration was 15900 cps. After shaking, the viscosity of the aerated milk composition was 10620 cps.

EXAMPLE 5

An aerated milk composition was prepared having the following formulation.

| Ingredients | Amount (Weight %) |
|---|---|
| Water | 70 |
| Non-fat dried milk | 10 |
| Cream | 5 |
| Sweetener | 13 |
| Starch | .75 |
| Gelatin | .25 |
| Gellan gum | .1 |
| Pectin AMD | .4 |
| Joha buffering salts | .05 |
| Anti-foam | 0.005% |

Preparation of an emulsified yogurt base was conducted as in Example 1. The emulsified yogurt base was then aerated with nitrogen gas in a Tanis Rotoplus 250 aerator to an overrun of 31.8%. Density measurement for an aerated milk composition prepared according to this embodiment showed density prior to aeration of 1.11 g/cc and density after aeration of 0.76 g/cc. Upon shaking of the aerated milk composition prepared according to this embodiment by hand for ten seconds, the density was 0.85 g/cc. Viscosity of the aerated milk composition 24 hours after aeration was 13880 cps. After shaking, the viscosity of the aerated milk composition was 11000 cps.

Although embodiments of the invention have been described above, it is not limited thereto, and it will be apparent to persons skilled in the art that numerous modifications and variations form part of the present invention insofar as they do not depart from the spirit, nature, and scope of the claimed and described invention.

We claim:

1. An aerated refrigerated milk composition comprising that will release from its gelled state when shaken, comprising:
   a. a yogurt base, the yogurt base comprising:
      about 6 to about 13% milk solids,
      about 0 to about 5% fat,
      about 5 to about 15% sweetener,
      about 0.5 to about 2.0% starch,
      about 0.6 to about 1.0% gelatin,
      about 0.00 to about 0.1% gellan gum,
      about 0.05 to about 1.0% pectin, and
      active bacterial cultures
         wherein the amounts of milk solids, fat, sweetener, starch, gelatin, gellan gum and pectin are based on the total weight of the yogurt base; and
   b. an emulsifier ingredient present in the amount of about 2 to about 10% based upon the total weight of the aerated milk composition; and
   c. an aerating gas;
wherein the aerated milk composition is refrigerated; and wherein the aerated density of the aerated milk composition is about 0.5 to about 1.0 cc/g. and wherein the viscosity of the aerated milk composition in its gelled state is at a finished viscosity wherein the composition does not flow, and after being shaken by hand in a container for about 10 seconds has a viscosity wherein the composition does flow, and may be consumed without aid of silverware or other utensils.

2. The aerated milk composition of claim 1, wherein the fat is a dairy fat and wherein the milk solids are non-fat milk solids.

3. The aerated milk composition of claim 2, wherein the emulsifier ingredient is a hydrated emulsifier ingredient, the hydrated emulsifier ingredient comprising:
   a. about 0.5% to about 1.5% wetting agent,
   b. about 7% to about 15% lactylated mono- and di-glycerides; and
   c. balance water;
      wherein the wetting agent is selected from the group consisting of citric acid esters of monoglycerides, diacetyl tartaric acid esters of monoglycerides, polysorbates, propylene glycol esters, sodium dodecyl sulphate, sodium stearoyl lactylate, and mixtures thereof pasteurized prior to combination with the yogurt base.

4. The aerated milk composition of claim 3, wherein the hydrated emulsifier ingredient is present at a level of about 3%.

5. The aerated milk composition of claim 2, wherein the gelatin is present at a level of about 0.68% based on the total weight of the yogurt base.

6. The aerated milk composition of claim 2, wherein the pectin is a high ester pectin present at a level of about 0.05% to about 0.1% based on the total weight of the yogurt base.

7. The aerated milk composition of claim 2, wherein the gellan gum is present at a level of about 0.05% to about 0.1% based on the total weight of the yogurt base.

8. The aerated milk composition of claim 4, wherein the gelatin is present at a level of about 0.68%, wherein the pectin is present at a level of about 0.1%, wherein the gellan gum is present at a level of about 0.05%, and wherein the amounts of gelatin, gellan gum and pectin are based on the total weight of the yogurt base.

9. The aerated milk composition of claim 8, further comprising a fruit constituent.

10. The aerated milk composition of claim 8, further comprising a low water activity sweet brown component admixed within the yogurt base.

11. A shelf-stable, aerated milk composition comprising:
   a. a yogurt base, the yogurt base comprising:
      about 6 to about 13% milk solids,
      about 0 to about 5% fat,
      about 5 to about 15% sweetener,
      about 0.5 to about 2.0% starch,
      about 0.6 to about 1.0% gelatin,
      about 0.05 to about 0.1% gellan gum,
      about 0.00 to about 1.0% pectin, and
      active bacterial cultures
         wherein the amounts of milk solids, fat, sweetener, starch, gelatin, gellan gum and pectin are based on the total weight of the yogurt base; and
   b. an emulsifier ingredient present in the amount of about 2 to about 10% based upon the total weight of the aerated milk composition; and
   c. an aerating gas;
wherein the aerated milk composition is refrigerated; and wherein the aerated density of the aerated milk composition is about 0.5 to about 1.0 cc/g and wherein the viscosity of the aerated milk composition in its gelled state is at a finished viscosity wherein the composition does not flow, and after being shaken by hand in a container for about 10 seconds has a viscosity wherein the composition does flow, and may be consumed without aid of silverware or other utensils.

12. The aerated milk composition of claim 11, wherein the pectin is a high ester pectin present at a level of about 0.05% to about 1.0% based on the total weight of the yogurt base.

13. The aerated milk composition of claim 1, wherein the final product has a viscosity of from about 17000 to about 20000 cps, and has a viscosity after shaking by hand in a container for about 10 seconds fof from about 7000 to about 10000 cps.

14. The aerated milk composition of claim 11, wherein the final product has a viscosity of from about 17000 to about 20000 cps, and has a viscosity after shaking by hand in a container for about 10 second of from about 7000 to about 10000 cps.

* * * * *